us011528296B2

United States Patent
Ramasamy et al.

(10) Patent No.: US 11,528,296 B2
(45) Date of Patent: Dec. 13, 2022

(54) UNAUTHORIZED DATA MANIPULATION DETECTION

(71) Applicant: BANK OF AMERICA CORPORATION, Charlotte, NC (US)

(72) Inventors: Suki Ramasamy, Chennai (IN); Satish Kumar Arunachalam Lakshmanan, Chennai (IN); Sudhansu Mohanty, Chennai (IN); Kumaraguru Mohan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 882 days.

(21) Appl. No.: 16/278,635

(22) Filed: Feb. 18, 2019

(65) Prior Publication Data

US 2020/0267179 A1  Aug. 20, 2020

(51) Int. Cl.
*H04L 9/40* (2022.01)
*G06N 20/20* (2019.01)
*G06F 40/55* (2020.01)

(52) U.S. Cl.
CPC .......... *H04L 63/1466* (2013.01); *G06F 40/55* (2020.01); *G06N 20/20* (2019.01); *H04L 63/1416* (2013.01)

(58) Field of Classification Search
CPC . H04L 63/1466; H04L 63/1416; G06F 40/55; G06N 20/20
See application file for complete search history.

(56) References Cited

U.S. PATENT DOCUMENTS

| | | | |
|---|---|---|---|
| 8,024,367 B2 | 9/2011 | Heinzel et al. | |
| 8,887,281 B2 * | 11/2014 | Honig | H04L 63/1416 713/189 |
| 9,009,307 B2 | 4/2015 | Jain et al. | |
| 9,104,720 B2 | 8/2015 | Rakshit et al. | |
| 9,219,639 B2 | 12/2015 | Jain et al. | |
| 9,299,241 B1 | 3/2016 | Monical et al. | |
| 9,716,613 B2 | 7/2017 | Jain et al. | |
| 9,906,554 B2 * | 2/2018 | Higbee | H04L 51/212 |
| 9,959,311 B2 | 5/2018 | Boguraev et al. | |
| 9,984,116 B2 | 5/2018 | Rais Ghasem et al. | |
| 10,114,738 B2 | 10/2018 | Dsouza | |
| 10,769,045 B1 * | 9/2020 | Sharifi Mehr | G06F 21/552 |
| 2009/0293123 A1 * | 11/2009 | Jackson | H04L 63/1458 726/23 |

(Continued)

*Primary Examiner* — Farid Homayounmehr
*Assistant Examiner* — Mudasiru Kolaegbe (57) ABSTRACT

A data manipulation detection device that includes an alert engine configured to receive data from a data source, apply a set of rules for a threat model to the data using a first machine learning model, and to obtain an alert vector in response to applying the set of rules to the data. The device further includes an alert feedback engine configured to receive alert feedback that includes text comments for the alert vector. The device further includes a natural language processing (NLP) training engine configured to identify the text comments for the alert status and identify keywords within the text comments associated with a rule parameter value for a rule. The NLP training engine is further configured to determine a new rule parameter value based on the identified keywords and modify a rule parameter value for the rule based on the new rule parameter value.

20 Claims, 3 Drawing Sheets

(56) References Cited

U.S. PATENT DOCUMENTS

| | | | | |
|---|---|---|---|---|
| 2012/0158413 A1* | 6/2012 | Goodwin | ............... | G06F 21/10 |
| | | | | 705/1.1 |
| 2018/0176243 A1* | 6/2018 | Arnaldo | .............. | H04L 63/1425 |
| 2019/0103095 A1* | 4/2019 | Singaraju | ............... | G06N 5/003 |
| 2019/0188562 A1* | 6/2019 | Edwards | .................. | G06N 3/04 |
| 2019/0191311 A1* | 6/2019 | O'Brien | ................ | G01C 21/00 |
| 2019/0312973 A1* | 10/2019 | Engelke | ............ | H04M 1/72433 |
| 2020/0065483 A1* | 2/2020 | Mu | ....................... | G06F 21/554 |
| 2020/0267179 A1* | 8/2020 | Ramasamy | ............ | G06N 20/20 |

\* cited by examiner

UNAUTHORIZED DATA MANIPULATION DETECTION

TECHNICAL FIELD

The present disclosure relates generally to information security, and more specifically to unauthorized data manipulation detection.

BACKGROUND

Many computer systems have expansive networks that include a large number of network devices. These computer systems allow data to be shared among the different network devices. One of the technical challenges that occurs in a computer system is controlling unauthorized access to data and data manipulation. For example, a bad actor (e.g. a hacker) may modify data stored in the network to gain access and/or to perform other malicious activities within the network. Identifying malicious attacks, such as data manipulation, in a network poses several technical challenges.

Conventional systems use a rigid set of rules or criteria to determine whether data has been modified. This approach is susceptible to a large number of false-positive and false-negative threat detections. False-positive threat detections degrade the performance of the system because the system's resources are consumed while analyzing the data, which was incorrectly identified as being modified, to determine further actions to be taken. This process both consumes processing resources and limits the system's throughput. Having a large number of false-negatives threat detections compromises the information security of the system and leaves the system vulnerable to other types of malicious activities or attacks.

Thus, it is desirable to provide a technical solution that provides the ability to more accurately detect attacks within a network.

SUMMARY

Many computer systems have expansive networks that include a large number of network devices. These computer systems allow data to be shared among the different network devices. One of the technical challenges that occurs in a computer system is controlling unauthorized access to data and data manipulation. For example, a bad actor (e.g. a hacker) may modify data stored in the network to gain access and/or to perform other malicious activities within the network. Identifying malicious attacks, such as data manipulation, in a network poses several technical challenges.

Conventional systems use a rigid set of rules or criteria to determine whether data has been modified. This approach is susceptible to a large number of false-positive and false-negative threat detections. False-positive threat detections degrade the performance of the system because the system's resources are consumed while analyzing the data, which was incorrectly identified as being modified, to determine further actions to be taken. This process both consumes processing resources and limits the system's throughput. Having a large number of false-negatives threat detections compromises the information security of the system and leaves the system vulnerable to other types of malicious activities or attacks.

One example of an attack occurs when a bad actor modifies data to introduce scripts or malware for performing malicious activities on the computer system. Once malware is downloaded by the computer system, the malware can overload computing resources by running unauthorized programs and scripts on the system. In addition, malware can cause problems such as disruptions to computer operations, data exfiltration, unauthorized access to system resources, slower processing speeds, connectivity issues, and frequent freezing or crashing. While computing resources are occupied by malware, the computer system has less processing resources and memory to perform other operations. This results in reduced performance of the system. Malware may also reduce the network bandwidth of the computer system by making unauthorized downloads or exfiltrating data from the computer system. Reducing the network bandwidth of the computer system limits the system's ability to send and receive data which degrades the throughput of the system.

The system described in the present application provides a technical solution to the technical problems discussed above by employing machine learning models to improve a system's ability to more accurately detect attacks within a network. The disclosed system provides several advantages which include 1) detecting data manipulation attacks, 2) dynamically adjusting rules for detecting threats or attacks based on user feedback, and 3) reducing the number of false-negative and false-positive threat detections compared to existing approaches.

In one embodiment, the data manipulation detection system provides the ability to detect data manipulation attacks and to dynamically adjust rules for detecting data manipulation attacks in a network environment. The data manipulation detection system is configured to use a first machine learning model to apply a set of rules to a data set to generate an alert vector that indicates whether any data manipulation has been detected. The data manipulation detection system is further configured to receive alert feedback (e.g. text comments) for the alert vector. The alert feedback may identify any false-positive or false-negative alerts and may provide instructions for adjusting the rules for detecting a data manipulation attack. The data manipulation detection system is configured to use a second machine learning model that employs natural language processing to interpret the alert feedback and to generate new rule parameter values based on the alert feedback. The data manipulation detection system is further configured to modify the set of rules used by the first machine learning models with the new rule parameter values. In contrast to conventional systems, this process allows the data manipulation detection system to dynamically adjust the rules and/or rule parameter values to increase or decrease the sensitivity when detecting instances of data manipulation attacks.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The system described in the present application provides a technical solution to the technical problems discussed above by employing machine learning models to improve a system's ability to more accurately detect attacks within a network. The disclosed system provides several advantages which include 1) detecting data manipulation attacks, 2) dynamically adjusting rules for detecting threats or attacks based on user feedback, and 3) reducing the number of false-negative and false-positive threat detections compared to existing approaches.

Figure 1:
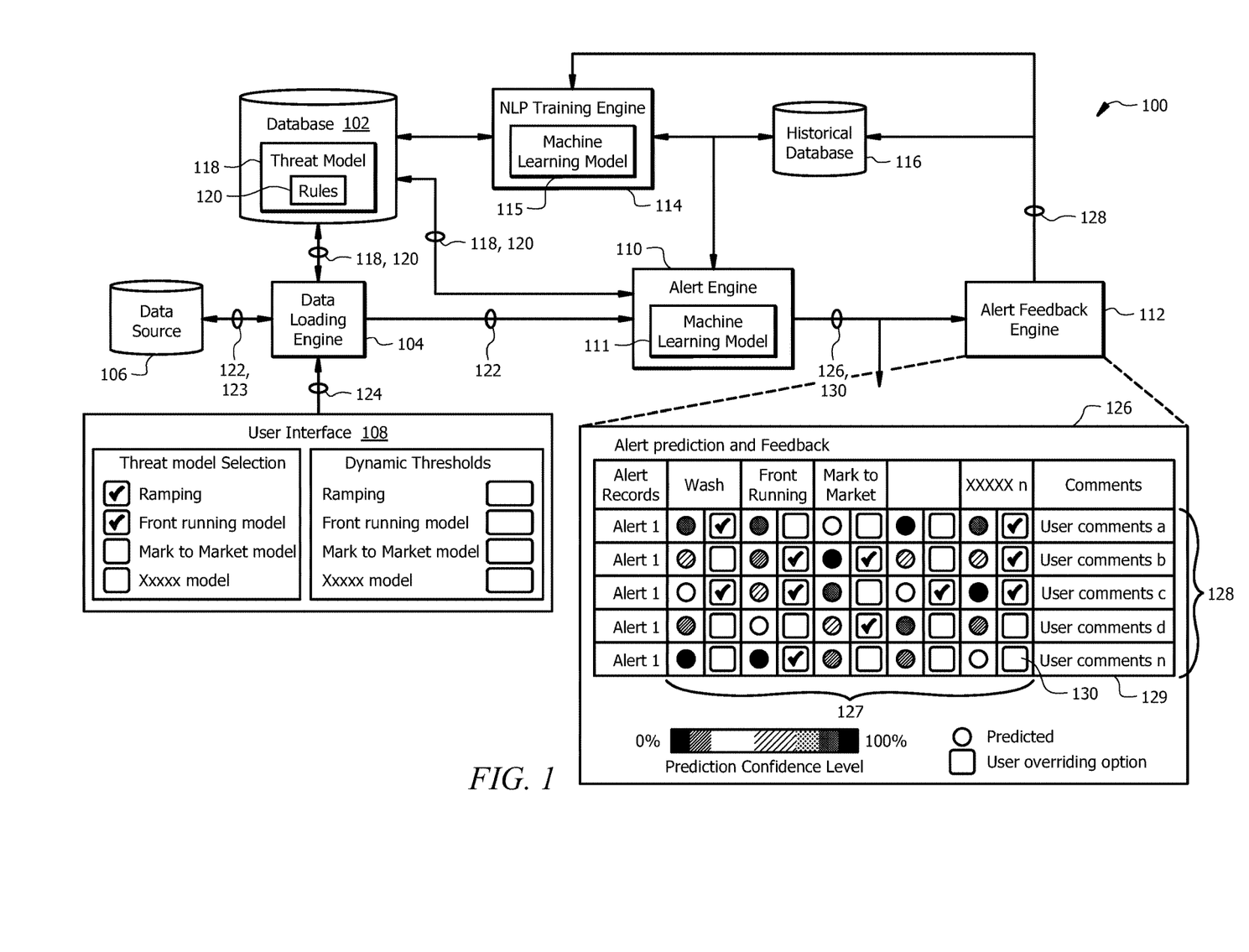
FIG. 1 is a schematic diagram of an embodiment of a data manipulation detection system.
Figure 2:
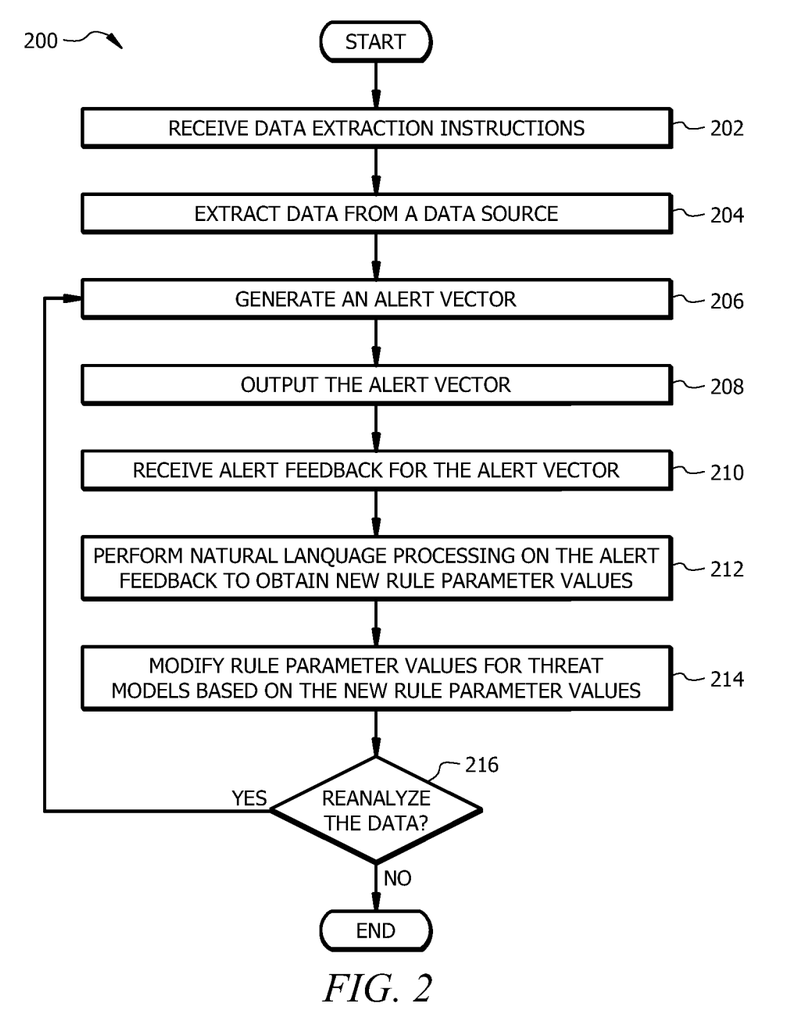
FIG. 2 is an embodiment of a flowchart of a data manipulation detection method.
Figure 3:
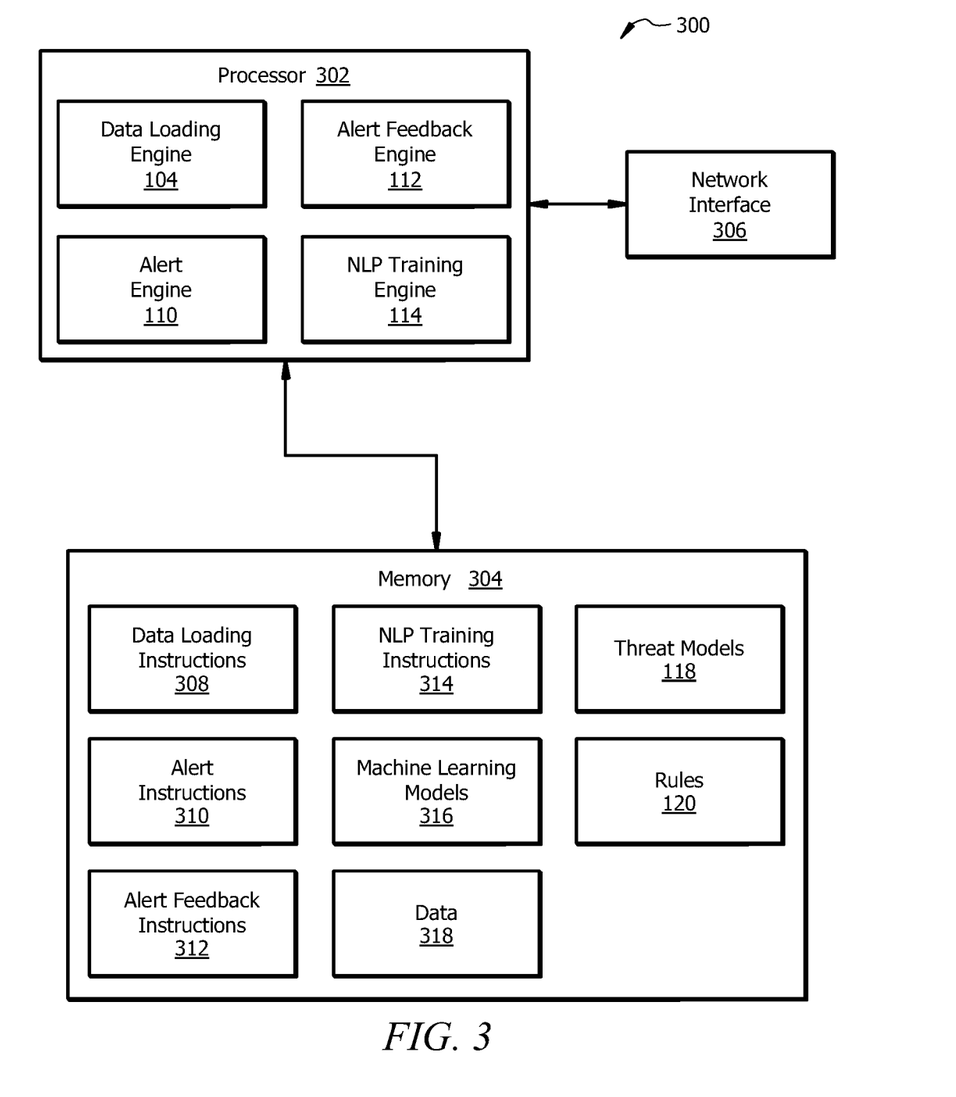
FIG. 3 is an embodiment of a device configured to implement the data manipulation detection system.

FIG. 1 is an example of a data manipulation detection system configured to detect attacks in a network. FIG. 2 is an example of a process for detecting data manipulation. FIG. 3 is an example of a device configured to implement the data manipulation detection system.

Data Manipulation Detection System Overview

FIG. 1 is a schematic diagram of an embodiment of a data manipulation detection system 100. The data manipulation detection system 100 is generally configured to detect data manipulation attacks in a network environment. An example of a data manipulation attack occurs when a bad actor corrupts or alters data. For example, a bad actor (e.g. a hacker) may modify data stored in the network to gain access and/or to perform other malicious activities within the network.

In one embodiment, the data manipulation detection system 100 provides the ability to detect data manipulation attacks and to dynamically adjust rules for detecting data manipulation attacks in a network environment. The data manipulation detection system 100 is configured to use a first machine learning model to apply a set of rules to a data set to generate an alert vector that indicates whether any data manipulation has been detected. The data manipulation detection system 100 is further to receive alert feedback (e.g. text comments) for the alert vector. The alert feedback may identify any false-positive or false-negative alerts and may provide instructions for adjusting the rules for detecting a data manipulation attack. The data manipulation detection system 100 is configured to use a second machine learning model that employs natural language processing to interpret the alert feedback and to generate new rule parameter values based on the alert feedback. The data manipulation detection system 100 is further configured to modify the set of rules used by the first machine learning models with the new rule parameter values. In contrast to conventional systems, this process allows the data manipulation detection system 100 to dynamically adjust the rules and/or rule parameter values to increase or decrease the sensitivity when detecting instances of data manipulation attacks.

The data manipulation detection system 100 comprises a database 102, a data loading engine 104, one or more data sources 106, an alert engine 110, an alert feedback engine 112, a natural language processing (NLP) training engine 114, and a historical database 116. The data manipulation detection system 100 may be configured as shown or in any other suitable configuration. An example of the data manipulation detection system 100 in operation is described in FIG. 2.

The database 102 is configured to store one or more threat models 118. Each threat model 118 may correspond with a different type of data manipulation attack. Each type of data manipulation attack may exhibit a particular set of features or characteristics that can be detected when determining whether a data manipulation attack has occurred. Each threat model 118 comprises a set of rules 120 that can be applied to a set of data 122 to determine whether the characteristics of a data manipulation attack are present and whether a data manipulation attack has occurred. Rules 120 may be associated with rule parameter values that identify data types, timer interval, threshold values, or any other features or characteristics that can be used to identify a data manipulation attack. Examples of the database 102 include, but are not limited to, memories (e.g. memory 304), servers, computing devices, or any other suitable type of device.

The data loading engine 104 is generally configured to obtain data 122 from one or more data sources 106 and to send the data 122 to the alert engine for processing. In one embodiment, the data loading engine 104 receives data extraction instructions 124 that identify one or more threat models 118. In this example, the data loading engine 104 obtains data 122 from a data source 106 based on the rules 120 associated with the identified threat models 118.

The data sources 106 are generally configured to store data 122. Examples of data 122 include, but are not limited to, documents, spreadsheets, database records, transactions or transaction data, or any other suitable type of data. The data manipulation detection system 100 may comprise or may be in signal communication with any suitable number of data sources 106. Examples of data sources 106 include, but are not limited to, the Internet, social media, databases, transaction systems, memories, servers, computing devices, or any other suitable type of device.

The alert engine 110 is generally configured to receive data 122 from the data loading engine 104 and to input the data 122 into a first machine learning model 111 to generate an alert vector 126. The alert vector 126 identifies any detected attacks corresponding with a threat model 118. The first machine learning model 111 is configured to apply a set of rules 120 corresponding with one or more threat models 118 to determine whether a data manipulation attack has been detected. In one embodiment, the first machine learning model 111 may be configured to identify correlations between different detected data manipulation attacks and an associated confidence level. The alert engine 110 may output (e.g. send or display) the generated alert vector 126 to one or more network devices.

The alert feedback engine 112 is generally configured to receive alert feedback 128 for the alert vector 126 and to send the alert feedback to the NLP training engine 114 for processing. The alert feedback 128 may comprise instructions, commands, and/or comments that are provided by a user in response to an alert vector 126. For example, the alert feedback 128 may comprise text comments, overwrite instructions for an alert, or any other suitable type of feedback for the alert vector 126.

The historical database 116 is generally configured to store previously generated data and/or previously received data for the data manipulation detection system 100. For example, the historical database 116 may be configured to store alert vectors 126, alert feedback 128, and/or any other suitable type of data. Examples of the historical database 116 include, but are not limited to, memories (e.g. memory 304), servers, computing devices, or any other suitable type of device.

The NLP training engine 114 is generally configured to use a second machine learning model 115 that employs natural language processing to interpret the alert feedback 128 and to generate new rule parameter values based on the alert feedback 128. For example, the NLP training engine 114 may increase or decreasing a threshold value for a rule 120 based on comments (e.g. keywords) in the alert feedback 128. The NLP training engine 114 is further configured to modify the set of rules 120 used by the first machine learning model 111 with the new rule parameter values. For example, the NLP training engine 114 may modify rule parameter values stored in the database 102 and/or the alert engine 110 based on the new rule parameter values.

Data Manipulation Detection Process Flow

FIG. 2 is an embodiment of a flowchart of a data manipulation detection method 200. The data manipulation detection system 100 may implement method 200 to detect the presence of a data manipulation attack.

At step 202, the data manipulation detection system 100 receives data extraction instructions 124. For example, the data loading engine 104 receives data extraction instructions 124 that identify one or more threat models 118. In one embodiment, the data manipulation system 100 may be configured to allow a user to generate and provide the data extraction instructions 124 using a graphical user interface. Referring to FIG. 1 as an example, a user may interact with a graphical user interface 108 to select or identify one or more threat models 118. The graphical user interface 108 may be configured to allow the user to input rule parameter values for one or more rules 120 associated with any of the identified threat models 118. For example, the graphical user interface 108 may receive threshold values or interval values.

Returning to FIG. 2 at step 204, the data manipulation detection system 100 extracts data 122 from one or more data sources 106. In one embodiment, the data loading engine 104 requests data 122 from the one or more data sources 106 based on the set of rules 120 for the identified threat models 118. For example, the set of rules 120 may be associated with particular data types or data formats. In this example, the data loading engine 104 may request data 122 that corresponds with the data types and/or data formats used by the set of rules 120.

In one embodiment, the data loading engine 104 generates a script 123 for requesting data 122 from a data source 106. The script 123 may comprise instructions identifying particular types of data, instructions for sending requested data, and/or any other suitable type of instructions. In one example, the data loading engine 104 may execute the script 123 to generate a request for data 122 from the data source 106. In this example, the data loading engine 104 sends the request to the data source 106 and receives the data 122 in response to sending the request. In another example, the data loading engine 104 may send the script 123 to the data source 106. In this example, the data source 106 executes the script 123 and provides the requested data 122 based on the instructions provided by the script 123. The data loading engine 104 sends the data 122 to the alert engine 110 in response to receiving the data 122 from the data source 106.

At step 206, the data manipulation detection system 100 generates an alert vector 126. The alert engine 110 receives the data 122 from the data loading engine 104 and processes the data 122 using a first machine learning model 111 to generate an alert vector 126. For example, the data 122 may comprise account information for an enterprise. The first machine learning model 111 may apply a set of rules 120 for a threat model 118 that define a time interval and an average account balance threshold value. In this example, the alert engine 110 may determine an average account balance value based on the data and may determine that a data manipulation attack has occurred based on a comparison between the average account balance value and the average account balance threshold value. In this example, the alert engine 110 may determine that a data attack has occurred when the average account balance value exceeds the average account balance threshold value and may determine that a data attack has not occurred when the average account balance value does not exceed the average account balance threshold value. In other examples, the first machine learning model 111 may apply any other rules 120 or combination of rules 120 to determine whether a data manipulation attack has occurred.

In one embodiment, the alert engine 110 receives instructions that identify the threat models 118 and/or rules 120 selected by the user in step 202. As an example, the alert engine 110 may receive information identifying a threat model 118 from the data loading engine 104. The alert engine 110 may then access the database 102 to identify the set of rules 120 associated with the threat model 118. In this example, the alert engine 110 applies the identified set of rules 120 to the data 122 using the first machine learning model 111 to generate an alert vector 126. Referring to FIG. 1 as an example, the alert vector 126 comprises alert statuses 127 for each of the threat models 118. An alert status 127 indicates whether a data manipulation attack has been detected. The alert engine 110 may indicate that data manipulation has occurred using any suitable technique. For example, the alert status 127 may be a flag or an indicator that is set when a data manipulation attack has been detected and may not be set when a data manipulation attack has not been detected. In one embodiment, the alert vector 126 comprises a confidence level associated with an alert status 127. The confidence level indicates the probability that the alert status 127 is true.

Returning to FIG. 2 at step 208, the data manipulation detection system 100 outputs the alert vector 126. The alert engine 110 may output the alert vector 126 to a network device or a graphical user interface (e.g. a display). Examples of network devices include, but are not limited to, computers, Internet-of-things (IoT) devices, mobile devices (e.g. smart phones or tablets), web clients, or any other suitable type of network device.

In one embodiment, the alert engine 110 is configured to determine whether the alert vector 126 comprises any alert status 127 that indicate a data manipulation attack has been detected and may send an alert 130 in response to the determination. The alert 130 may be an email, a text message (e.g. a short message service (SMS) message), an application pop-up alert, or any other suitable type of message notification. As another example, the alert engine 110 may trigger an event that causes the data manipulation detection system 100 to automatically perform one or more actions to isolate or flag the affected data. For instance, the alert engine 110 may block or restrict communications that includes the affected data 122 in response to determining that a data manipulation attack has occurred.

At step 210, the data manipulation detection system 100 receives alert feedback 128 for the alert vector 126. The alert feedback 128 comprises text comments 129 that are linked with one or more alert statuses 127 in the alert vector 126. For example, upon review of the alert vector 126, an admin may determine that an alert status 127 is incorrect. The admin may provide text comments that describe the error and/or actions for correcting the error. For example, the text comments may identify a rule 120 and/or a rule parameter value that should be adjusted. In other examples, the text comments may comprise any other information associated with an alert status 127 and/or for modifying an alert status 127. Continuing with the previous example described in step 206, the alert vector 126 may indicate that a data manipulation attack was detected. The alert feedback 128 may comprise text comments that indicate that the average account balance threshold value should be increased to reduce the sensitivity for the data manipulation attack identified by the alert vector 126. In this example, the alert feedback 128 may or may not specify a new average account balance threshold value.

In one embodiment, the alert feedback 128 may comprise alert status overwrite instructions 130 that indicate modifications to one or more of the alert statuses 127 in the alert vector 126. For example, the alert status overwrite instructions 130 may identify a change to an alert status 127 from a state that indicates a data manipulation attack was detected to another state that indicates that a data manipulation attack was not detected. In this example, the alert engine 110 may have generated an alert status 127 that indicates that a data manipulation attack has occurred. Upon review of the alert vector 126, an admin may determine that the alert status 127 is incorrect and may provide alert status overwrite instructions 130 that corrects the alert status 127. The alert feedback engine 112 may indicate a state change to an alert status 127 using any suitable technique. The alert feedback engine 112 sends the alert feedback 128 to the NLP engine 114 in response to receiving the alert feedback 128. The alert feedback engine 112 may also store the alert feedback 128 in the historical database 116.

At step 212, the data manipulation detection system 100 performs natural language processing on the alert feedback 128 to obtain new rule parameter values. The NLP training engine 114 performs natural language processing using a second machine learning model 115 to identify text (e.g. text comments 128) within the alert feedback and to identify the content of the text. For example, the NLP training engine 114 may identify keywords corresponding with a rule 120, rule parameter values, and/or instructions that are described in the alert feedback 128. In one embodiment, the second machine learning model 115 may be trained to associate keywords with particular actions. For example, the second machine learning model 115 may associate keywords that indicate an increase with an action of increasing a rule parameter value by a predetermined amount or percentage. In this example, the second machine learning model 115 outputs a new rule parameter value that is larger than the previous rule parameter value based on the identified keywords. Similarly, the second machine learning model 115 may associate keywords that indicate a decrease with an action of decreasing a rule parameter value by a predetermined amount or percentage. In this example, the second machine learning model 115 outputs a new rule parameter value that is smaller than the previous rule parameter value based on the identified keywords. In other examples, the second machine learning model 115 may determine a new rule parameter value using keywords that indicate a particular rule parameter.

Continuing with the previous example described in steps 206 and 210, the NLP training engine 114 receives the alert feedback 128 that includes the text comments about the average account balance threshold value. The NLP training engine 114 may parse the alert feedback 128 and identify the comments and keywords about increasing the average account balance threshold value. The NLP training engine 114 is further configured to determine a new average account balance threshold value based on the alert feedback 128. In some examples, the NLP training engine 114 may be configured to increase the average account balance threshold value by a fixed amount or percentage based on the alert feedback 128. In other examples, the NLP training engine 114 may be configured to apply a machine learning algorithm to determine the new average account balance threshold value. In other examples, the NLP training engine 114 may determine the new average account balance threshold value using any other suitable technique.

At step 214, the data manipulation detection system 100 modifies rule parameter values for threat models 118 based on the new rule parameter values. In one embodiment, the NLP training engine 114 may access the database 102 to overwrite existing rule parameter values with the new rule parameter values. For example, the NLP training engine 114 may identify the rules 120 associated with the average account balance threshold value and update the rule parameter values for the identified rules 120. In another embodiment, the NLP training engine 114 may send instructions or commands to the database 102 and/or the alert engine 110 that identifies a rule 120 and a new rule parameter value. In this example, database 102 and/or the alert engine 110 overwrites rule parameter value of the identified rule 102 with the new rule parameter value in response to receiving the instructions from the NLP training engine 114.

At step 216, the data manipulation detection system 100 determines whether to reanalyze the data. For example, the data manipulation detection system 100 may be configured to automatically generate an updated alert vector 126 based on the new parameter values once the set of rules 120 for the threat model 118 have been updated. As another example, the data manipulation detection system 100 may prompt a user whether to reanalyze the data 122 using the new parameter values. In other examples, the data manipulation detection system 100 may determine whether to reanalyze the data 122 using any other suitable technique. The data manipulation detection system 100 returns to step 206 in response to determining to reanalyze the data 122. Otherwise, the data manipulation detection system 100 terminates method 200.

Data Manipulation Detection Device

FIG. 3 is an embodiment of a device 300 configured to implement the data manipulation detection system 100. The device 300 comprises a processor 302, a memory 304, and a network interface 306. The device 300 may be configured as shown or in any other suitable configuration.

The processor 302 comprises one or more processors operably coupled to the memory 304. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 304. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the data loading engine 104, the alert engine 110, the alert feedback engine 112, and the NLP training engine 114. In this way, processor 302 may be a special purpose computer designed to implement the function disclosed herein, such as some or all of method 200. In an embodiment, the data loading engine 104, the alert engine 110, the alert feedback engine 112, and the NLP training engine 114 are each implemented using logic units, FPGAs, ASICs, DSPs, or any other suitable hardware. The data loading engine 104, the alert engine 110, the alert feedback engine 112, and the NLP training engine 114 are configured as described in FIGS. 1 and 2.

The memory 304 comprises one or more disks, tape drives, or solid-state drives, and may be used as an over-flow data storage device, to store programs when such programs are selected for execution, and to store instructions and data that are read during program execution. The memory 304 may be volatile or non-volatile and may comprise read-only memory (ROM), random-access memory (RAM), ternary content-addressable memory (TCAM), dynamic random-access memory (DRAM), and static random-access memory (SRAM).

The memory 304 is operable to store data loading instructions 308, alert instructions 310, alert feedback instructions 312, NLP training instructions 314, machine learning models 316, data 318, threat models 118, rules 120, and/or any other data or instructions. The data loading instructions 308, alert instructions 310, alert feedback instructions 312, and NLP training instructions 314 may comprise any suitable set of instructions, logic, rules, or code operable to execute the data loading engine 104, the alert engine 110, the alert feedback engine 112, and the NLP training engine 114, respectively. Threat models 118 and rules 120 are configured similar to the threat models 118 and rules 120 described in FIG. 1. Machine learning models 316 comprise the first machine learning model 111 and the second machine learning model 115 that are described in FIGS. 1 and 2. Data 318 may comprise data 122, alert vectors 126, alert feedback 128, or any other suitable type of data for the data manipulation detection system 100.

The network interface 306 is configured to enable wired and/or wireless communications. The network interface 306 is configured to communicate data between the device 300 and other network devices, systems, or domain. For example, the network interface 306 may comprise a WIFI interface, a local area network (LAN) interface, a wide area network (WAN) interface, a modem, a switch, or a router. The processor 302 is configured to send and receive data using the network interface 306. The network interface 306 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A data manipulation detection device, comprising:
a network interface configured to receive data from a data source;
a memory operable to store a threat model, wherein:
the threat model comprises a set of rules for identifying a data manipulation attack; and
each rule is associated with a rule parameter value;
a data loading engine implemented by a processor, configured to:
receive data extraction instructions, wherein the data extraction instructions identify one or more rules from the threat model and rule parameter values for the one or more identified rules; and
receive data from the data source;
an alert engine implemented by a processor, configured to:
apply the one or more identified rules from the threat model to the data using a first machine learning model;
obtain an alert vector in response to applying the one or more rules to the data, wherein the alert vector comprises an alert status that indicates the data manipulation attack is detected;
block data communications that contain the data within a network in response to detecting the data manipulation attack; and
send the alert vector to an alert feedback engine;
the alert feedback engine implemented by the processor, configured to:
receive alert feedback for the alert vector, wherein the alert feedback comprises text comments for the alert status, wherein the text comments for the alert status comprise information associated with correcting one or more errors in the alert status;
correct the one or more errors in the alert status based on the text comments; and
send the alert feedback to a natural language processing (NLP) training engine; and
the NLP training engine implemented by the processor, configured to:
perform natural language processing on the alert feedback using a second machine learning model, wherein performing natural language processing on the alert feedback comprises:
identifying the text comments for the alert status; and identifying one or more keywords within the text comments associated with a rule parameter value for a rule;

determine a new rule parameter value based on the identified one or more keywords; and modify the rule parameter value for the rule based on the new rule parameter value.

2. The device of claim 1, wherein the data loading engine, further configured to:

generate a script for requesting the data from the data source;

execute the script to retrieve the data from the data source; and send the data to the alert engine.

3. The device of claim 1, wherein the alert vector comprises a confidence level associated with the alert status.

4. The device of claim 1, wherein the alert feedback comprises alert status overwrite instructions indicating a modification to the alert status.

5. The device of claim 1, wherein the alert engine is configured to output the alert vector to one or more network devices.

6. The device of claim 1, wherein modifying the rule parameter value for the rule comprises overwriting an existing rule parameter value for the rule with the new rule parameter value.

7. The device of claim 1, wherein modifying the rule parameter value for the rule comprises sending the new rule parameter value to the alert engine.

8. A data manipulation detection method, comprising:

receiving, at a data loading engine implemented by a processor, data extraction instructions, wherein the data extraction instructions identify one or more rules from a threat model and rule parameter values for the one or more identified rules;

receiving, at the data loading engine, data from a data source;

applying, by an alert engine implemented by a processor, the one or more identified rules from the threat model to the data using a first machine learning model;

obtaining, by the alert engine, an alert vector in response to applying the one or more identified rules to the data, wherein the alert vector comprises an alert status that indicates a data manipulation attack is detected;

blocking, by the alert engine, data communications that contain the data within a network in response to detecting the data manipulation attack;

receiving, at an alert feedback engine implemented by the processor, alert feedback for the alert vector, wherein the alert feedback comprises text comments for the alert status, wherein the text comments for the alert status comprise information associated with correcting one or more errors in the alert status;

correcting the one or more errors in the alert status based on the text comments;

performing, by a natural language processing (NLP) training engine implemented by the processor, natural language processing on the alert feedback using a second machine learning model, wherein performing natural language processing on the alert feedback comprises:

identifying the text comments for the alert status; and identifying one or more keywords within the text comments associated with a rule parameter value for a rule;

determining, by the NLP training engine, a new rule parameter value based on the identified one or more keywords; and modifying, by the NLP training engine, the rule parameter value for the rule based on the new rule parameter value.

9. The method of claim 8, further comprising:

generating, by the data loading engine, a script for requesting the data from the data source;

executing, by the data loading engine, the script to retrieve the data from the data source; and sending, by the data loading engine, the data to the alert engine.

10. The method of claim 8, wherein the alert vector comprises a confidence level associated with the alert status.

11. The method of claim 8, wherein the alert feedback comprises alert status overwrite instructions indicating a modification to the alert status.

12. The method of claim 8, further comprising outputting, by the alert engine, the alert vector to one or more network devices.

13. The method of claim 8, wherein modifying the rule parameter value for the rule comprises overwriting an existing rule parameter value for the rule with the new rule parameter value.

14. The method of claim 8, wherein modifying the rule parameter value for the rule comprises sending the new rule parameter value to the alert engine.

15. A non-transitory computer readable medium comprising executable instructions that when executed by a processor causes the processor to:

receive data extraction instructions, wherein the data extraction instructions identify one or more rules from a threat model and rule parameter values for the one or more identified rules;

receive data from a data source;

apply the one or more identified rules from the threat model to the data using a first machine learning model;

obtain an alert vector in response to applying the one or more identified rules to the data, wherein the alert vector comprises an alert status that indicates a data manipulation attack is detected;

block data communications that contain the data within a network in response to detecting the data manipulation attack;

receive alert feedback for the alert vector, wherein the alert feedback comprises text comments for the alert status, wherein the text comments for the alert status comprise information associated with correcting one or more errors in the alert status;

correct the one or more errors in the alert status based on the text comments;

perform natural language processing on the alert feedback using a second machine learning model, wherein performing natural language processing on the alert feedback comprises:

identifying the text comments for the alert status; and identifying one or more keywords within the text comments associated with a rule parameter value for a rule;

determine a new rule parameter value based on the identified one or more keywords; and modify the rule parameter value for the rule based on the new rule parameter value.

16. The non-transitory computer readable medium of claim 15, wherein the alert vector comprises a confidence level associated with the alert status.

17. The non-transitory computer readable medium of claim 15, wherein the alert feedback comprises alert status overwrite instructions indicating a modification to the alert status.

18. The non-transitory computer readable medium of claim 15, further comprising outputting the alert vector to one or more network devices.

19. The non-transitory computer readable medium of claim 15, wherein modifying the rule parameter value for the rule comprises overwriting an existing rule parameter value for the rule with the new rule parameter value.

20. The non-transitory computer readable medium of claim 15, wherein modifying the rule parameter value for the rule comprises sending the new rule parameter value to the alert engine.

* * * * *